United States Patent
Hefner, Jr. et al.

(10) Patent No.: US 9,487,617 B2
(45) Date of Patent: *Nov. 8, 2016

(54) PREPARATION AND USES OF EPOXY RESINS OF CYCLODODECANE POLYPHENOLS

(71) Applicant: Dow Global Technologies LLC, Midland, MI (US)

(72) Inventors: Robert E. Hefner, Jr., Rosharon, TX (US); Erich J. Molitor, Midland, MI (US)

(73) Assignee: Dow Global Technologies, LLC

( * ) Notice: Subject to any disclaimer, the term of this patent is extended or adjusted under 35 U.S.C. 154(b) by 102 days.

This patent is subject to a terminal disclaimer.

(21) Appl. No.: 14/375,332

(22) PCT Filed: Feb. 22, 2013

(86) PCT No.: PCT/US2013/027244
§ 371 (c)(1),
(2) Date: Jul. 29, 2014

(87) PCT Pub. No.: WO2013/126642
PCT Pub. Date: Aug. 29, 2013

(65) Prior Publication Data
US 2015/0018456 A1    Jan. 15, 2015

Related U.S. Application Data

(60) Provisional application No. 61/602,895, filed on Feb. 24, 2012.

(51) Int. Cl.
| | | |
|---|---|---|
| C08G 8/04 | (2006.01) | |
| C08G 59/06 | (2006.01) | |
| C08L 63/00 | (2006.01) | |
| C09D 163/00 | (2006.01) | |
| C09D 5/03 | (2006.01) | |
| C08G 59/14 | (2006.01) | |
| C08G 59/18 | (2006.01) | |
| C08G 59/32 | (2006.01) | |

(52) U.S. Cl.
CPC ............ *C08G 59/063* (2013.01); *C08G 59/14* (2013.01); *C08G 59/182* (2013.01); *C08G 59/3218* (2013.01); *C08L 63/00* (2013.01); *C09D 5/03* (2013.01); *C09D 163/00* (2013.01); *C08L 2205/025* (2013.01)

(58) Field of Classification Search
CPC ..... C07C 37/20; C07C 39/17; C07C 261/02; C07C 2101/14
See application file for complete search history.

(56) References Cited

U.S. PATENT DOCUMENTS

| | | | |
|---|---|---|---|
| 3,770,702 A * | 11/1973 | Roper et al. | 526/68 |
| 3,838,175 A | 9/1974 | Berther et al. | |
| 4,623,701 A | 11/1986 | Massingill | |
| 5,736,620 A | 4/1998 | Earls et al. | |
| 2003/0069455 A1 | 4/2003 | Lane et al. | |
| 2012/0238668 A1 | 9/2012 | Metral et al. | |
| 2012/0238709 A1 | 9/2012 | Metral et al. | |
| 2012/0289624 A1 | 11/2012 | Metral et al. | |

OTHER PUBLICATIONS

Jay, Direct Titration of Epoxy Compounds and Aziridines, Analytical Chemistry, vol. 36, No. 3, pp. 667-668, Mar. 1964.
Lee, et al. Handbook of Epoxy Resins, Copyright 1967, pp. 2-6 through 2-9 and pp. 11-13 through 11-14.
Whittington, The term "cured" or "thermoset" as defined by L.R. Whittington, Whittington's Dictionary of Plastics, p. 239, 1968.
Zahir, Studies in the Photodimerization of Diglycidyl Ether of 4,4'-Dihydroxychalcone, Journal of Applied Polymer Science, 1979, vol. 23, pp. 1355-1372.

* cited by examiner

*Primary Examiner* — Shane Fang

(57) ABSTRACT

Polyglycidyl ethers of the formula:

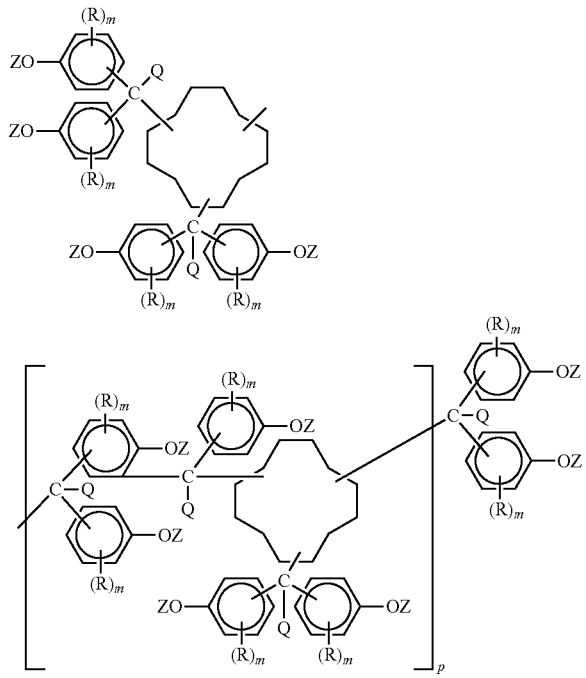

where R, m, Q, p and Z are as defined here. Methods of forming said polyglycidyl ethers and methods of using said polyglycidyl ethers to make epoxy resin oligomers and polymers, including powder coatings.

20 Claims, No Drawings

PREPARATION AND USES OF EPOXY RESINS OF CYCLODODECANE POLYPHENOLS

CROSS REFERENCE TO RELATED APPLICATIONS

This application is a 35 USC §371 national phase filing of PCT/US2013/027244 filed Feb. 22, 2013, which claims the benefit of U.S. Application No. 61/602,895, filed Feb. 24, 2012.

FIELD OF THE INVENTION

Disclosed herein are methods of preparing and using epoxy resins based on the polyphenols of cyclododecane (hereinafter, "CDD"). The epoxy resins may be used to create new oligomers and/or thermoset polymers.

BACKGROUND OF THE INVENTION

Phenolic resins are synthetic materials that vary greatly in molecular structure. This variety allows for a multitude of applications for these resins; for example, use as a curing agent and/or to prepare the corresponding epoxy, cyanate and/or allyl thermosettable resins. These curing agents and/or resins can provide enhanced physical and/or mechanical properties to a cured composition, such as increased glass transition temperature (Tg). To achieve improved properties, however, would require the resin to have a high functionality (i.e., chemical groups available for cross linking). However, as the functionality increases in these resins, so does their molecular weight, which increases the melt viscosity of the resin and can lead to difficulties in using such resins.

One strategy for preparing thermosettable epoxy resins is to convert a phenol into a glycidyl ether. An example is the diglycidyl ether of the diphenol of cyclododecanone (eCDON), which is an epoxy resin useful in structural or electrical laminates and/or composites, functional powder coatings, etc. However, for thermosets of eCDON there is a need to 1) increase Tg, 2) increase thermal stability (for example improve maintenance of Tg with thermal cycling), and 3) improve curing profile (for example decrease onset to cure temperature and cure enthalpy). Thermosets of epoxy resins of CDD polyphenols have now surprisingly been found to provide remarkable Tg's (>300° C.) and improved cure profile including rapid onset to cure and reduced cure enthalpy. Furthermore when used in blends for example with eCDON, epoxy resins of CDD polyphenols may impart increased Tg, thermal stability and/or improved cure profile to the thermosets thereof. Thermosets with improvements in one or more of these properties find added utility in higher performance thermosets, useful in structural or electrical laminates and/or composites, multilayer electronic circuitry, integrated circuit packaging (such as "IC substrates"), filament windings, moldings, encapsulations, castings, composites for aerospace applications, adhesives, functional powder coatings and other protective coatings. In related U.S. application No. 61/602,840, filed Feb. 24, 2012, Applicants reported the preparation of the trialdehyde of cyclododecane and its subsequent conversion to polyphenols such as the hexaphenol. Applicants now report the conversion of the CDD polyphenols to the corresponding thermosettable polyglycidyl ethers (PGEs). Said PGEs may be blended with one or more other epoxy resins, such as eCDON and with one or more curing agents and/or curing catalysts to form a curable blend having increased Tg, increased thermal stability and/or improved cure profile when compared to thermosets of eCDON alone.

The high functionality of the PGEs disclosed herein provide high crosslink density upon curing. This high crosslink density translates to very high Tg temperatures, enhanced thermal stability, more rapid development of Tg during curing, and improved reactivity on curing, as demonstrated in the Examples (below).

The PGEs of the present invention are especially useful as a component in formulations with one or more conventional epoxy resins to provide improved properties. Numerous other benefits are expected from the PGEs, including very high modulus, increased moisture resistance and increased corrosion resistance.

The cured compositions described herein are particularly useful in the aerospace industry, the electronics industry (where they may be used in laminates or composites) and as a powder coating, particularly a functional powder coating as is used on pipe and rebar, where high Tg, solvent resistance, abrasion resistance and/or toughness may be beneficial. The cured compositions may be used in the form of sheets, films, fibers or other shaped articles.

SUMMARY OF THE INVENTION

In one aspect, disclosed herein are PGEs of CDD polyphenols represented by Formula 1:

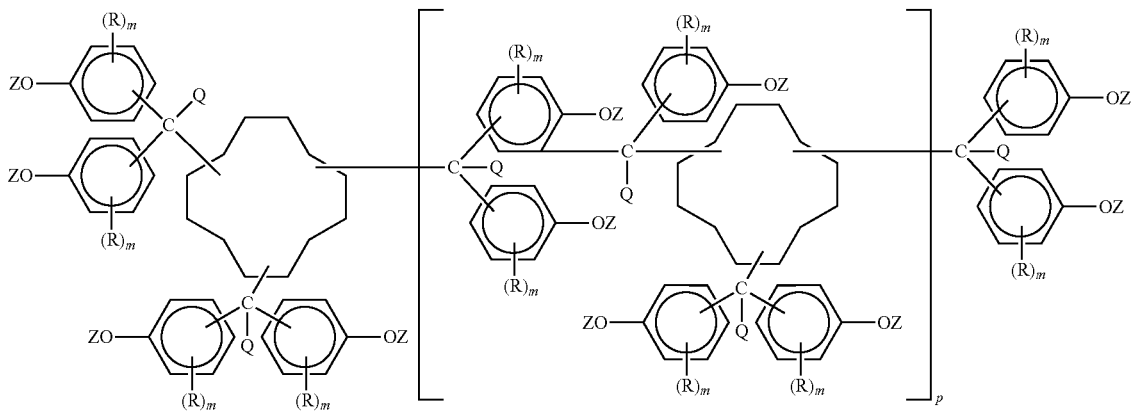

where each Z is a

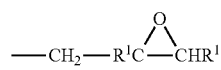

group, each $R^1$ is independently hydrogen or methyl, each m independently has a value of zero to 3, p has a value of zero to 20, preferably zero to 5, most preferably zero to 1; each R is independently halogen, preferably fluorine, chlorine or bromine; nitrile; nitro; $C_1$-$C_6$ alkyl or $C_1$-$C_6$ alkoxy preferably the alkyl and alkoxy groups independently have 1 to 4, most preferably 1 to 2 carbon atoms which may be substituted with one or more halogen atoms, preferably chlorine or bromine; or $C_2$-$C_6$ alkenyl or $C_2$-$C_6$ alkenyloxy, preferably the aforementioned alkenyl groups have 2 to 4, most preferably 2 to 3 carbon atoms; and each Q is independently hydrogen or $C_1$-$C_6$ alkyl, preferably the alkyl group has 1 to 4, most preferably 1 to 2 carbon atoms. Each R group may independently be a $C_3$-$C_4$ alkylene group that optionally contains one or two double bonds and is bonded to two adjacent carbons on the ring to which it is attached; thereby producing fused rings systems such as naphthyl, tetrahydronaphthyl, indenyl or indanyl.

It should be understood that the composition of the compounds of Formula 1 can be mixtures with various values of p. For such mixtures the values of p can be described as number average degrees of oligomerization.

For the various embodiments, when m has a value other than zero, the carbon bonded to Q is preferably in the ortho and/or para position relative to the —OH group. It is appreciated that mixtures of compounds having the carbon bonded to the Q in both the ortho and the para position relative to the —OH group are possible. It is also possible to have the carbon bonded to Q in the meta position relative to the —OH group.

In another aspect, disclosed herein are methods of making the PGEs of Formula 1, using polyphenols of Formula 2 as a starting material:

resin of Formula 1, and 3) optionally, a second epoxy resin other than the epoxy resin of Formula 1.

In another aspect, the PGEs of Formula 1 can also be used in forming adducts, for example with a polyalkylenepolyamine, useful as (a) epoxy resin curing agents, (b) reactants for thermoset polyurethanes, polyureaurethanes, and polyisocyanurates and (c) initiators for polyols useful in preparation of polyurethanes, polyureaurethanes, and polyisocyanurates.

DETAILED DESCRIPTION

As used herein, the term "thermoset" as used herein refers to a polymer that can solidify or "set" irreversibly when heated. The terms "curable," "cured," "thermosettable" and "thermoset" are synonyms and mean the composition is capable of being converted to a cured or thermoset state or condition. The term "cured" or "thermoset" is defined by L. R. Whittington in Whittington's Dictionary of Plastics (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The term "B-stage" as used herein refers to a thermoset resin that has been thermally reacted beyond the A-stage so that the product has full to partial solubility in a solvent such as an alcohol or a ketone.

The term "adduct" means a product of a direct addition of two or more distinct molecules, resulting in a single reaction product. The resultant reaction product or adduct is considered a distinct molecular species from the reactants.

In one embodiment, preferred compounds of Formula 1 are compounds of Formula 3, i.e., compounds of Formula 2, where Z and p are as previously defined, each m is 0 and each Q is H. Compounds of Formula 3 are non-sintering and thus especially useful in preparation of powder coating formulations.

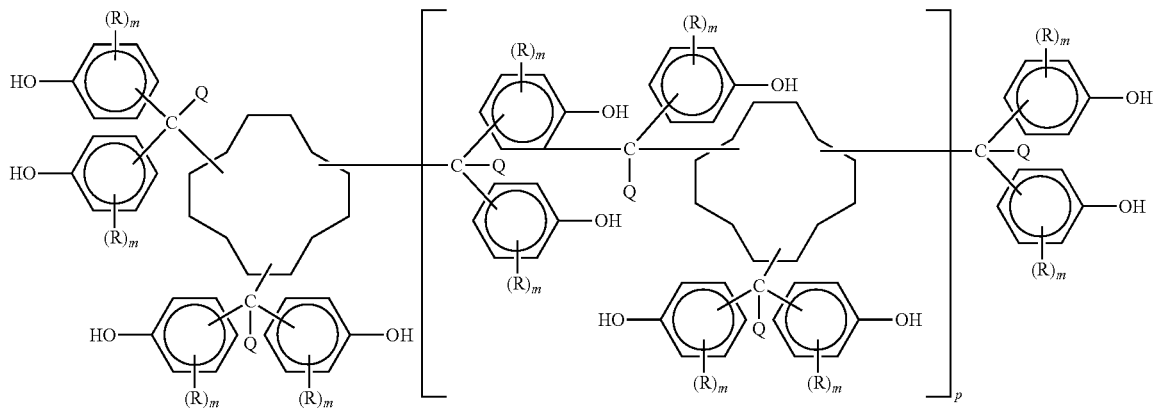

where R, Q, m and p are as hereinbefore defined.

In another aspect, disclosed herein are curable compositions, partially oligomerized or polymerized (B-staged) products, or cured (thermoset) products comprising 1) at least one curing agent and/or curing catalyst, 2) a first epoxy Mixtures of CDD diphenols and/or tetraphenols with hexaphenols plus oligomers, if any, may be employed to prepare the disclosed PGEs. An example of the tetraglycidyl ethers with saturated CDD ring is represented by Formula 4:

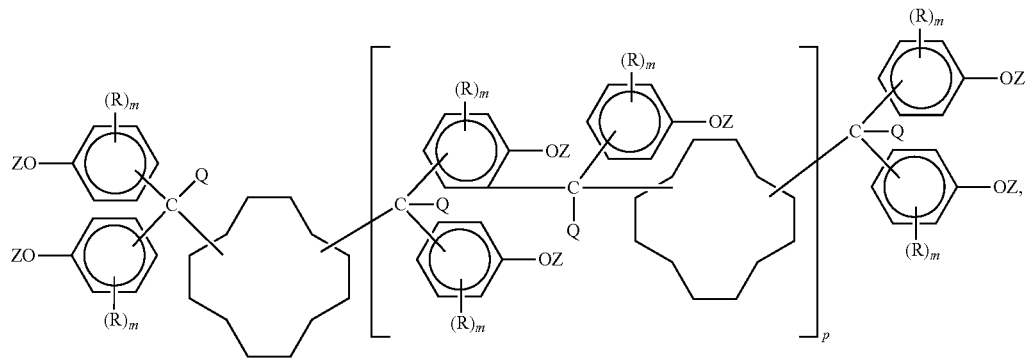

where Z, R, Q, m, and p are as hereinbefore defined. When p is 0, the tetraglycidyl ether free of oligomers is produced. When p is greater than 0, an oligomeric component is present.

A preferred method of making PGEs of Formula 1 comprises reacting polyphenols of Formula 2 with an epihalohydrin. For the various embodiments, the reaction can take place in the presence of a suitable basic acting substance, in the presence or absence of a catalyst and in the presence or absence of a solvent.

For the various embodiments, the reaction preferably takes place at a temperature of 20° C. to 120° C., more preferably at a temperature of 30° C. to 85° C., and most preferably at a temperature of 40° C. to 75° C. For the various embodiments, the reaction also preferably takes place at a pressure of 30 mm Hg vacuum to 690 KPa, more preferably at a pressure of 30 mm Hg vacuum to 345 KPa, and most preferably at a pressure of 60 mm Hg vacuum to 101 KPa (1 atmosphere). For the various embodiments, the reaction can take place at a time sufficient to complete the reaction, preferably from 1 to 120 hours, more preferably from 3 to 72 hours, and most preferably from 4 to 48 hours.

For the various embodiments, the reaction also uses from 1.1:1 to 25:1, preferably from 3:1 to 15:1, and most preferably from 5:1 to 10:1 moles of epihalohydrin per phenolic hydroxy group. This initial reaction, unless the catalyst is an alkali metal or alkaline earth metal hydroxide employed in stoichiometric or greater quantities, produces a halohydrin intermediate which is then reacted with the basic acting substance to convert the vicinal halohydrin groups to epoxide groups. The resultant product is a glycidyl ether compound. Details concerning preparation of epoxy resins are given in U.S. Pat. No. 5,736,620; Handbook of Epoxy Resins by Lee and Neville, McGraw-Hill (1967); and Journal of Applied Polymer Science, volume 23, pages 1355-1372 (1972); and U.S. Pat. No. 4,623,701.

Suitable epihalohydrins include epichlorohydrin, epibromohydrin, epiiodohydrin, methylepichlorohydrin, methylepibromohydrin, methylepiiodohydrin and combinations thereof. Most preferred is epichlorohydrin.

A suitable basic acting substance is employed to prepare the PGEs of CDD polyphenols of the present disclosure. Suitable basic acting substances (bases) include the alkali metal or alkaline earth metal hydroxides, carbonates and bicarbonates, and combinations thereof. Preferred are NaOH, KOH, LiOH, Ca(OH)$_2$, Ba(OH)$_2$, Mg(OH)$_2$, Mn(OH)$_2$, Na$_2$CO$_3$, K$_2$CO$_3$, Li$_2$CO$_3$, CaCO$_3$, BaCO$_3$, Mg$_2$CO$_3$, MnCO$_3$, NaHCO$_3$, KHCO$_3$, MgHCO$_3$, LiHCO$_3$, Ca(HCO$_3$)$_2$, Ba(HCO$_3$)$_2$, Mn(HCO$_3$)$_2$, and combinations thereof. More preferred are inorganic hydroxides, such as NaOH or KOH (both which may be aqueous).

For processes involving reaction of the CDD polyphenols with an alkali metal hydride followed by reaction with the epihalohydrin, suitable alkali metal hydrides include, for example, sodium hydride and potassium hydride, with sodium hydride being most preferred. Other methods of preparing PGEs of Formula 1 include converting the polyphenol of Formula 2 to the corresponding polyallyl ether and then epoxidizing the olefinic portions of the allyl groups.

Suitable catalysts that can be employed to prepare the PGEs of CDD polyphenols include the ammonium or phosphonium halides, for example, benzyltrimethylammonium chloride and bromide, benzyltriethylammonium chloride and bromide, tetrabutylammonium chloride and bromide, tetraoctylammonium chloride, tetramethylammonium chloride and bromide, tetrabutylphosphonium chloride, bromide and iodide; ethyltriphenylphosphonium chloride, bromide and iodide; and combinations thereof. Benzyltrimethylammonium chloride and benzyltriethylammonium chloride are more preferred.

Suitable solvents that can be employed to prepare the PGEs of CDD polyphenols include aliphatic and aromatic hydrocarbons, aliphatic secondary alcohols, halogenated aliphatic hydrocarbons, aliphatic ethers, aliphatic nitriles, cyclic ethers, ketones, amides, sulfoxides, and combinations thereof. Particularly suitable solvents include pentane, hexane, octane, toluene, xylene, methylethylketone, methylisobutylketone, N,N-dimethylformamide, dimethylsulfoxide, tetrahydrofuran, 1,4-dioxane, dichloromethane, ethylene glycol dimethyl ether, N,N-dimethylacetamide, acetonitrile, isopropanol (preferred), isobutanol, propylene glycol monomethyl ether, and combinations thereof. One possible process for preparing the PGEs of CDD polyphenols of the present disclosure is done in the absence of a solvent, where the epihalohydrin, such as epichlorohydrin, is used in an amount to function as both the solvent and reactant.

Analytical methods, such as high pressure liquid chromatography (HPLC), may be employed to monitor reaction of the CDD polyphenols concurrently with the formation of intermediate product, such as the halohydrin, and the final PGEs of CDD polyphenols.

Recovery and purification of the PGEs of CDD polyphenols can be performed using a variety of methods. For example, gravity filtration, vacuum filtration, centrifugation, water washing or extraction, solvent extraction, decantation, column chromatography, vacuum distillation, falling film distillation, electrostatic coalescence, and other processing methods and the like may be used. Vacuum distillation is a preferred method for recovery of lighter boiling fractions, such as unused epihalohydrin, which may be recycled.

Oligomers present in the PGEs may arise from (1) epoxidation of oligomeric components present in the CDD polyphenols (Formula 2 where a part up to all of p is greater than 0) or from (2) in situ advancement reaction of a portion of the glycidyl ether moieties. Advancement is characterized by the formation of the 2-hydroxypropyl ether linkage (the structure of Formula 5) in the epoxy resin product:

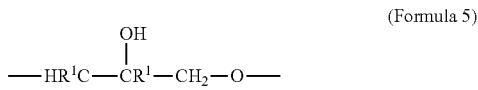

(Formula 5)

where $R^1$ is as previously defined.

Also disclosed herein are curable compositions, partially oligomerized or polymerized (B-staged) products, or cured (thermoset) products comprising 1) at least one curing agent and/or curing catalyst, 2) a first epoxy resin of Formula 1, and 3) optionally, a second epoxy resin other than the epoxy resin of Formula 1. One or more thermosettable monomers, for example, di- and poly(cyanate)s, bis- and poly(maleimide)s, di- and poly(isocyanate)s, di and poly(cyanamide)s, polymerizable mono, di, or poly(ethylenically unsaturated) monomers, including vinyl benzyl ethers, allyl and allyloxy compounds may also be included in the curable compositions.

Epoxy resins other than those of Formula 1 that can be used as the second epoxy resin include can be an epoxide-containing compound having an average of more than one epoxide group per molecule. The epoxide group can be attached to an oxygen, a sulfur or a nitrogen atom or the single bonded oxygen atom attached to the carbon atom of a —CO—O— group. The oxygen, sulfur, nitrogen atom, or the carbon atom of the —CO—O— group may be attached to an aliphatic, cycloaliphatic, polycycloaliphatic or aromatic hydrocarbon group. The aliphatic, cycloaliphatic, polycycloaliphatic or aromatic hydrocarbon group can be substituted with one or more inert substituents including, but not limited to, halogen atoms, preferably fluorine, bromine or chlorine; nitro groups; or the groups can be attached to the terminal carbon atoms of a compound containing an average of more than one —(O—CHR$^a$—CHR$^a$)$_t$— group, where each R$^a$ is independently H, an alkyl, or a haloalkyl group containing from one to two carbon atoms, with the proviso that only one R$^a$ group can be a haloalkyl group, and t has a value from one to 100, preferably from one to 20, more preferably from one to 10, and most preferably from one to 5. Specific examples include glycidyl ether, glycidyl thioether, glycidyl amine and glycidyl ester compounds having an average of more than one epoxide group per molecule.

More specific examples of the epoxy resin which can be used include diglycidyl ethers of 1,2-dihydroxybenzene; 1,3-dihydroxybenzene; 1,4-dihydroxybenzene; 4,4'-isopropylidenediphenol; 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 4,4'-dihydroxybiphenyl; 4,4'-dihydroxy-alpha-methylstilbene; 4,4'-dihydroxybenzanilide; 4,4'-dihydroxydiphenylacetylene; dipropylene glycol; poly(propylene glycol); thiodiglycol; the triglycidyl ether of tris(hydroxyphenyl)methane; the PGEs of a phenol or alkyl or halogen substituted phenol-aldehyde acid catalyzed condensation product (novolac resins); the tetraglycidyl amine of 4,4'-diaminodiphenylmethane; the PGEs of the condensation product of a dicyclopentadiene or an oligomer thereof and a phenol or alkyl or halogen substituted phenol; and combinations thereof.

The epoxy resin which can be used may also include an advanced epoxy resin. The advanced epoxy resin may be a product of an advancement reaction of an epoxy resin with an aromatic di- and polyhydroxyl, or carboxylic acid containing compound. The epoxy resin used in the advancement reaction may include one or more of the aforesaid epoxy resins.

Preparation of the aforementioned advanced epoxy resin products can be performed using known methods, for example, an advancement reaction of an epoxy resin with one or more suitable compounds having an average of more than one reactive hydrogen atom per molecule, where the reactive hydrogen atom is reactive with an epoxide group in the epoxy resin. The ratio of the compound having an average of more than one reactive hydrogen atom per molecule to the epoxy resin is generally from 0.01:1 to 0.95:1, preferably from 0.05:1 to 0.8:1, and more preferably from 0.10:1 to 0.5:1 equivalents of the reactive hydrogen atom per equivalent of the epoxide group in the epoxy resin.

In addition to the aforementioned dihydroxyaromatic and dicarboxylic acid compounds, examples of the compound having an average of more than one reactive hydrogen atom per molecule may also include dithiol, disulfonamide, or compounds containing one primary amine or amide group, two secondary amine groups, one secondary amine group and one phenolic hydroxy group, one secondary amine group and one carboxylic acid group, or one phenolic hydroxy group and one carboxylic acid group, and combinations thereof.

The advancement reaction may be conducted in the presence or absence of a solvent with the application of heat and mixing. Suitable pressures are atmospheric, superatmospheric or subatmospheric. Suitable temperatures are from 20° C. to 260° C., preferably, from 80° C. to 240° C., and more preferably from 100° C. to 200° C.

Time required to complete the advancement reaction depends upon factors such as temperature employed, chemical structure of the compound having more than one reactive hydrogen atom per molecule employed, and chemical structure of the epoxy resin employed. Higher temperature may require shorter reaction time whereas lower temperature requires a longer reaction time. In general, the time for completion of the advancement reaction may range from 5 minutes to 24 hours, preferably from 30 minutes to 8 hours, and more preferably from 30 minutes to 4 hours.

A catalyst may also be added in the advancement reaction. Examples of the catalyst may include phosphines, quaternary ammonium compounds, phosphonium compounds and tertiary amines. The catalyst may be employed in quantities of from 0.01 percent to 3 percent, preferably from 0.03 percent to 1.5 percent, and more preferably from 0.05 percent to 1.5 percent by weight based upon the total weight of the epoxy resin.

Other details concerning an advancement reaction useful in preparing the advanced epoxy resin are provided in U.S. Pat. No. 5,736,620 and in the Handbook of Epoxy Resins by Henry Lee and Kris Neville.

Curing agents and/or catalysts useful for the curable composition include aliphatic, cycloaliphatic, polycycloaliphatic or aromatic primary monoamines, aliphatic, cycloaliphatic, polycycloaliphatic or aromatic primary and secondary polyamines, carboxylic acids and anhydrides thereof, aromatic hydroxyl containing compounds, imidazoles, guanidines, urea-aldehyde resins, melamine-aldehyde resins, alkoxylated urea-aldehyde resins, alkoxylated melamine-aldehyde resins, amidoamines, epoxy resin adducts, and combinations thereof.

Particularly preferred examples of other curing agents include methylenedianiline; dicyandiamide; ethylenediamine; diethylenetriamine; triethylenetetramine; tetraethylenepentamine; urea-formaldehyde resins; melamine-formaldehyde resins; methylolated urea-formaldehyde resins; methylolated melamine-formaldehyde resins; bisphenols such as bisphenol A, bisphenol F, and bisphenol S tetrabromobisphenol A; phenol-formaldehyde novolac resins; cresol-formaldehyde novolac resins; sulfanilamide; diaminodiphenylsulfone; diethyltoluenediamine; isophoronediamine; diaminocyclohexane; hexamethylenediamine, piperazine; 1-(2-aminoethyl)piperazine; 1,12-dodecanediamine; tris-3-aminopropylamine; and combinations thereof.

One or more curing agents may be employed to cure the curable composition. The amounts of curing agent(s) are from 0.60:1 to 1.50:1, and preferably from 0.95:1 to 1.05:1 equivalents of reactive hydrogen atom in the curing agent(s) per epoxide equivalent.

Particularly preferred examples of the curing catalyst include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, metallic acylates such as stannous octoate or zinc octoate and combinations thereof.

The curing catalyst may be employed in an amount that will effectively cure the curable composition. The amount of the curing catalyst may also depend upon the PGE of Formula 1, the second epoxy resin, if any, and the curing agent employed in the curable composition.

Generally, the curing catalyst may be used in an amount of from 0.001 to 2 percent by weight of the total curable composition. One or more of the curing catalysts may be employed to accelerate or otherwise modify the curing process of the curable composition.

The process of curing the curable composition of the present disclosure may be conducted at atmospheric (e.g. 760 mm Hg), superatmospheric or subatmospheric pressures and at a temperature from 0° C. to 350° C., preferably from 25° C. to 300° C., and more preferably from 50° C. to 250° C. Time required to complete the curing may depend upon the temperature employed. Higher temperatures generally require a shorter period of time whereas lower temperatures generally require longer periods of time. In general, the required time for completion of the curing is from 1 minute to 48 hours, preferably from 15 minutes to 24 hours, and more preferably from 30 minutes to 12 hours. It is also operable to partially cure the curable composition to form a B-stage product and subsequently cure the B-stage product completely at a later time.

The epoxy resin of Formula 1, curable compositions, partially oligomerized or polymerized (B-staged) products, or cured (thermoset) products of the present disclosure may also be combined with other resins, such as, but not limited to polyurethane resins, polyester resins, phenoxy resins, polyolefin resins, and combinations thereof.

The adducts of the present disclosure can be prepared by reaction of (1) one or more of the PGEs of CDD polyphenols of Formula 1 and, optionally, (2) one or more second epoxy resin other than the epoxy resin of Formula 1, with (3) one or more hydrogen containing compounds possessing one of more hydrogen atoms per molecule that are reactive with epoxide groups, such as those epoxide groups contained in the PGEs of CDD polyphenols (Formula 1). Preparing adducts with the PGEs of the present disclosure allows for incorporation of the physical and the mechanical property advantages of the CDD structure, as well as the physical and mechanical property advantages imparted by the high degree of functionality to be combined into the adduct. Thus, enhanced glass transition temperatures, high temperature resistance, improved moisture resistance and corrosion resistance, as well as enhanced electrical properties, especially dissipation factor, are expected as a result of the CDD structure when the adducts are used in the formation of thermosets (including both epoxy or polyurethane types).

The hydrogen containing compound that includes one or more reactive hydrogen atoms per molecule that are reactive with an epoxide group(s) may further include aliphatic, cycloaliphatic or aromatic groups within the hydrogen containing compound. The aliphatic groups may be branched or unbranched. The aliphatic or cycloaliphatic groups may also be saturated or unsaturated and may include one or more substituents that are inert (not reactive) to the process of preparing the adduct of the present disclosure including the reactants and the products. The substituents may be attached to a terminal carbon atom or may be between two carbon atoms, depending on the chemical structures of the substituents. Examples of such inert substituents include halogen atoms, preferably chlorine or bromine, nitrile, nitro, alkyloxy, keto, ether (—O—), thioether (—S—), or tertiary amine. The aromatic ring, if present within the hydrogen containing compound structure, may include one or more heteroatoms such as N, O, or S.

Examples of the hydrogen containing compound may include compounds such as (a) di- and polyphenols, (b) di- and polycarboxylic acids, (c) di- and polymercaptans, (d) di- and polyamines, (e) primary monoamines, (f) sulfonamides, (g) aminophenols, (h) aminocarboxylic acids, (i) phenolic hydroxyl containing carboxylic acids, (j) sulfanilamides, (k) monofunctional phosphorous compounds and (l) combinations of two or more of such compounds or the like.

A sufficient amount of the PGE of Formula 1 and the second epoxy resin other than the epoxy resin of Formula 1, if used, and an excess amount of the hydrogen containing compound are provided in a reaction mixture to form the adduct. At the end of the adduct forming reaction, essentially all of the epoxide groups are reacted with the reactive hydrogen atoms in the hydrogen containing compound. The unreacted hydrogen containing compound may be removed partially or completely at the end of the reaction or may remain as a part of the adduct product. In general, the ratio of the hydrogen containing compound and the PGE is from 2:1 to 200:1, preferably from 3:1 to 100:1, and more preferably from 4:1 to 50:1 equivalents of the reactive hydrogen atom in the hydrogen containing compound per equivalent of epoxide group in the PGE of Formula 1 and the second epoxy resin other than the epoxy resin of Formula 1, if used.

A catalyst may be employed to prepare the adduct. Examples of the catalyst include phosphines, quaternary ammonium compounds, phosphonium compounds, tertiary amines and combinations thereof. The amount of catalyst used, if any, depends upon the particular reactants used for preparing the adduct and the type of catalyst employed. In general, the catalyst may be used in an amount of from 0.01 to 1.5 percent, and preferably from 0.03 to 0.75 percent by weight based on the total weight of the adduct.

One or more solvents may be present in the adduct forming reaction. The presence of a solvent or solvents can improve the solubility of the reactants or, if the reactant is in a solid form, dissolve the solid reactant for easy mixing with other reactants. The presence of the solvent may also dilute the concentration of the reactants in order to moderate the adduct forming reaction such as to control heat generated from the adduct forming reaction or to lower the effective concentration of a reactant which can in turn influence the structure of the adduct product, for example, produce an adduct with less oligomeric component.

The solvent may be substantially inert to the adduct forming reaction including inert to the reactants, the intermediate products if any, and the final products. Examples of suitable solvents useful in the present disclosure include aliphatic, cycloaliphatic and aromatic hydrocarbons, halogenated aliphatic and cycloaliphatic hydrocarbons, aliphatic and cycloaliphatic secondary alcohols, aliphatic ethers, aliphatic nitriles, cyclic ethers, glycol ethers, esters, ketones, amides, sulfoxides and combinations thereof. Preferred examples of the solvents include pentane, hexane, octane, cyclohexane, methylcyclohexane, toluene, xylene, methylethylketone, methylisobutylketone, cyclohexanone, N,N-dimethylformamide, dimethylsulfoxide, tetrahydrofuran, 1,4-dioxane, dichloromethane, ethylene dichloride, methyl chloroform, ethylene glycol dimethyl ether, N,N-dimethylacetamide, acetonitrile, isopropanol and combinations thereof. The solvent may be removed at the completion of the adduct forming reaction using conventional means, such as, for example, vacuum distillation. Alternatively, the solvent may also be left in the adduct product to provide a solvent borne adduct which may be used later, for example, in the preparation of coating or film.

The adduct forming reaction conditions may vary depending upon factors such as types and amounts of reactants employed, type and amount of catalyst used, if any, type and amount of solvent used, if any, and modes of addition of the reactants employed. For example, the adduct forming reaction may be conducted at atmospheric (e.g. 760 mm Hg), superatmospheric or subatmospheric pressures and at temperature of from 0° C. to 260° C., and preferably from 20° C. to 200° C., and more preferably from 25° C. to 160° C.

The time required to complete the adduct forming reaction depends not only upon the aforementioned factors, but also upon the temperature employed. Higher temperature requires a shorter time, whereas lower temperature requires a longer time. In general, the time to complete the adduct forming reaction is preferred to be from 5 minutes to one week, more preferably from 30 minutes to 72 hours, and most preferably from 60 minutes to 48 hours.

The time and temperature of the adduct forming reaction may have significant impact on the distribution of components in the formation of the adduct of the present disclosure. For example, with higher reaction temperature, longer reaction time, and when the hydrogen containing compound includes a material having only two reactive hydrogen atoms per molecule, the adduct forming reaction favors the formation of the adduct with more oligomeric components. The adduct forming reaction favors the formation of the adduct with more branched or crosslinked components when the hydrogen containing compound includes a material having more than two reactive hydrogen atoms per molecule.

In carrying out the adduct forming reaction, the PGE of Formula 1 and the second epoxy resin if used, may be directly mixed together with the hydrogen containing compound, added to the hydrogen containing compound in incremental steps, or added to the hydrogen containing compound continuously. In addition, one or more solvents may be first added to the PGE and/or the hydrogen containing compound before mixing the PGE and the hydrogen containing compound. If incremental addition of the PGE is used, all or a part of an added increment may be allowed to react prior to addition of the next increment. The incremental addition of the PGE reacted within an excess amount of the hydrogen containing compound generally favors the formation of the adduct with a lesser amount or free of oligomeric components.

Various post treatments may be applied to the process of preparing the adduct in order to modify: 1) the distribution of the amounts of individual components of the adduct, 2) the reactivity of the adduct, and/or 3) the physical properties of the adduct. Accordingly, post treatment of the adduct product, such as vacuum distillation, may be employed to strip out the unreacted hydrogen containing compound. Other post treatment methods used to modify the distribution of the adduct components may also be employed, such as, for example, recrystallization, chromatographic separation, extraction, zone refining, crystal refining, falling film distillation, wiped film distillation, simple distillation, including rotary evaporation, preferential chemical derivatization and removal of one or more components of the adduct, and combinations thereof.

The reaction of one or more PGEs of Formula 1 with one or more hydrogen containing compounds possessing reactive hydrogen atoms to form the adduct involves a ring opening reaction. During the ring opening reaction, the epoxide groups in the PGE react with the reactive hydrogen atoms in the hydrogen containing compound to give characteristic 2-hydroxylpropyl functionalities as linkages between residual structures of the PGE and residual structures of the hydrogen containing compound.

The adduct can be blended with one or more epoxy resins (such as one or more second epoxy resins and/or one or more PGEs of Formula 1) and cured.

The compounds of Formulas 1 and/or 2 may be used to make a curable powder coating composition using methods known in the art. For example, the components of the powder coating composition of the present invention are typically pre-blended or ground in a grinder, and the resulting ground powder mixture exiting from the grinder is then fed into an extruder.

In the extruder, the powder mixture is heated at low temperature and melted into a semi-liquid form. During this process, the components of the molten mixture are thoroughly and uniformly dispersed. Because of the fast operation of the extruder and the relatively low temperature within the extruder, the components of the powder coating composition will not undergo a significant chemical reaction. The resulting molten extrudate of the powder coating composition exiting from the extruder is then passed from the extruder onto a flaker which then feeds the flakes of the composition into a mill/classifier to obtain a powder coating final product with a desired particle size. The final powder coating product is then packaged in closed containers, using a packaging unit to avoid moisture ingression into the product. The apparatus for manufacturing the powder coating compositions are well known equipment in the art.

The powder coating composition of the present invention may be applied to a substrate of an article by various methods. In one embodiment, the powder coating composition may be applied to a substrate by (1) heating the substrate to a suitable curing temperature for the composition; and (2) applying the powder coating composition by known means such as an electrostatic spray or a fluidized bed. In another embodiment, the epoxy powder coating composition may be applied to a cold substrate by (1) applying the epoxy powder coating composition to the substrate (e.g. with an electrostatic application method); and (2) heating the powder and the substrate to a temperature at which the powder flows and cures.

In some embodiments, powder coatings may be formed by applying a thermosettable resin composition to a substrate and then curing the curable thermosettable resin composition.

EXAMPLES

Example 1

Synthesis of Epoxy Resin of Polyphenol of CDD Trialdehyde

A. Phenolation of CDD Trialdehyde

CDD trialdehyde obtained from the hydroformylation of cyclododecatriene was analyzed by gas chromatography demonstrating the following composition: cyclododecatriene (0.15 wt. %), CDD monoaldehyde (0.16 wt. %), CDD dialdehyde (9.52 wt. %) and CDD trialdehyde (88.72 wt. %). Reaction of CDD trialdehyde (39.74 g, 0.16 mole, 0.48 aldehyde eq) and molten phenol (301.2 g, 3.2 moles) using 3-mercapto-1-propane sulfonic acid catalyst (total catalyst used was 1.25 g, 0.05 mole % with respect to CDD trialdehyde reactant) provided the polyphenol of CDD trialdehyde as a reddish tan colored powder (107.00 g). HPLC analysis of a sample of the product demonstrated the presence of 1.89 area % residual phenol. FTIR spectrophotometric analysis of a KBr pellet revealed complete disappearance of the aldehyde carbonyl stretch at 1721.9 cm$^{-1}$ with appearance of strong aromatic ring absorbance at 1610.8 (shoulder at 1595.5) and 1510.2 cm$^{-1}$, broad strong hydroxyl O—H stretching centered at 3382.3 cm$^{-1}$, and broad strong C—O stretching at 1229.4 (shoulder at 1170.5) cm$^{-1}$. HPLC analysis revealed the polyphenol of CDD trialdehyde included multiple components eluting between 3.24 to 8.30 min (phenol residual eluted at 2.49 min).

B. Epoxidation of Polyphenol of CDD Trialdehyde

A 1 L, three neck glass round bottom reactor was charged with a portion of the polyphenol of CDD trialdehyde (10.0 g, 0.0781 hydroxyl eq, based on a nominal hydroxyl equivalent weight of 128.124) from A. above and epichlorohydrin (180.6 g, 1.95 moles). The reactor was additionally equipped with a condenser (maintained at 0° C.), a thermometer, a Claisen adaptor, an overhead nitrogen inlet (1 L per min), a stirrer assembly (Teflon™ paddle, glass shaft, variable speed motor), and a heating mantle with temperature controller. Sodium hydroxide (2.8 g, 0.0703 mole) was dissolved in DI water (11.2 g) to form an aqueous sodium hydroxide solution. The aqueous sodium hydroxide solution was added to a side arm vented addition funnel and then attached to the reactor.

Stirring of the slurry commenced followed by addition of isopropanol (97.3 g, 35% wt of the epichlorohydrin used) then DI water (15.7 g, 8% wt of the epichlorohydrin used). Heating of the stirred light yellow colored 16° C. solution commenced then once 50° C. was achieved, dropwise addition of the aqueous sodium hydroxide solution from the side arm vented addition funnel commenced. Continued dropwise addition of the aqueous sodium hydroxide at 50° C. produced a slightly cloudy light yellow colored mixture. The addition was completed over 38 min. After 25 min of post reaction, stirring and heating ceased and the reactor contents were added to a separatory funnel and allowed to settle. At the end of the settling time (7 min), the aqueous layer was removed, discarded as waste and the clear light yellow colored organic layer recovered and added back into the reactor. Heating and stirring resumed to re-establish the 50° C. temperature. Dropwise addition of a second portion of the sodium hydroxide (1.25 g, 0.0313 mole) dissolved in DI water (5.0 g) commenced and was completed over 10 min while maintaining the temperature at 50° C. After 25 min of post reaction, stirring and heating ceased and the reactor contents were added to a separatory funnel and allowed to settle. At the end of the settling time (6 min), the aqueous layer was removed, discarded as waste and the clear light yellow colored organic layer recovered and added back into the reactor. Heating and stirring resumed to re-establish the 50° C. temperature. Dropwise addition of a third portion of the sodium hydroxide (0.39 g, 0.00975 mole) dissolved in DI water (1.56 g) commenced and was completed over 7 min while maintaining the temperature at 50° C. After 25 min of post reaction, stirring and heating ceased and the reactor contents were added to a separatory funnel containing DI water (200 mL) and thoroughly mixed then allowed to settle. At the end of the settling time (25 min), the aqueous layer was removed and discarded as waste. DI water (100 mL) was added to the clear light yellow colored organic layer, thoroughly mixed and then allowed to settle for the next 16 hr. The aqueous layer was removed and discarded as waste and the resultant organic layer was dried over a bed of anhydrous sodium sulfate supported in a fritted glass funnel then vacuum filtered. Dichloromethane was used as needed to wash product from the filter bed into the filtrate. Rotary evaporation of the filtrate using a maximum oil bath temperature of 75° C. removed the bulk of the volatiles. Further rotary evaporation at 100° C. to a final vacuum of 0.29 mm of Hg, followed by drying in the vacuum oven at 100° C. for 14 hr gave 8.58 g of transparent light yellow colored solid.

Gas chromatographic (GC) analysis [Hewlett Packard 5890 Series II Gas Chromatograph using a 60 m×0.248 mm×0.25 μm J&W GC column with DB-1 stationary phase, flame ionization detector operating at 300° C., a 300° C. injector temperature, helium carrier gas flow through the column was maintained at 1.1 mL per min, and an initial 50° C. oven temperature with heating at 12° C. per minute to a final temperature of 300° C.] revealed that essentially all light boiling components, including residual epichlorohydrin, had been removed. HPLC analysis revealed the PGE of the polyphenol of CDD trialdehyde included multiple components eluting between 5.0 to 13.5 min. Titration of a pair of aliquots of the product demonstrated an average of 18.81% epoxide (228.76 EEW). Titration of epoxy resins is described by Jay, R. R., "Direct Titration of Epoxy Compounds and Aziridines", Analytical Chemistry, 36, 3, 667-668 (March, 1964). Briefly, in our adaptation of this method, the weighed sample (sample weight ranges from 0.14-0.16 g using a scale with 4 decimal place accuracy) was dissolved in dichloromethane (15 mL) followed by the addition of tetraethylammonium bromide solution in acetic acid (15 mL). The resultant solution treated with 3 drops of crystal violet solution (0.1% w/v in acetic acid) was titrated with 0.1N perchloric acid in acetic acid on a Metrohm 665 Dosimat titrator (Brinkmann). Titration of a blank consisting of dichloromethane (15 mL) and tetraethylammonium bromide solution in acetic acid (15 mL) provided correction for solvent background.

Example 2

Preparation of Curable Blend of Epoxy Resin of Polyphenol of CDD Trialdehyde and Diethylenetriamine (DETA)

Epoxy resin of polyphenol of CDD trialdehyde (2.1608 g, 0.009446 epoxide eq) from Example 1 B was dissolved in THF (20 mL) under a dry, nitrogen atmosphere. The THF used had been purified by passing through a column of heat activated alumina under a dry, nitrogen atmosphere. DETA (0.1949 g, 0.009446-NH eq) was weighed into the glass bottle containing the THF solution under a dry, nitrogen atmosphere followed by shaking to provide a homogeneous solution. All weighing was completed on scales with 4 place accuracy. A portion (approximately 0.75 g) of the THF solution was added to an aluminum dish and devolatilized in the 21° C. vacuum oven. For analysis of curing, a DSC 2910 Modulated DSC (TA Instruments) was employed, using a heating rate of 7° C. per min from 0° C. to 250° C. under a stream of nitrogen flowing at 35 cubic centimeters per min, with holding at 0° C. for 2 min. The sample weight used for the DSC analysis was measured after completion of the analysis in the event that a weight change was caused by traces of residual THF solvent. For a portion (8.8 mg) of the epoxy resin of polyphenol of CDD trialdehyde and DETA, a 49.2° C. onset to cure was detected, followed by a cure exotherm having a maximum of 85.4° C. and an enthalpy of 141.9 J/g, and an end of cure of 198.4° C. (Table I).

The remaining blend was held under a dynamic dry nitrogen atmosphere for 48 hr. to devolatilize followed by completion of cured by placing the aluminum dish in an oven which had been preheated to 70° C. for 1 hr, then 100° C. for 1 hr, 125° C. for 1 hr, 150° C. for 1 hr, and 200° C. for 1 hr. The resultant clear unfilled casting was rigid, transparent and yellow colored. DSC analysis of a portion (22.5 mg) of the cured product was completed using a heating rate of 7° C. per min from 0° C. to 300° C. under a stream of nitrogen flowing at 35 cubic centimeters per min, with holding at 300° C. for 5 min. The first, second, third and fourth scannings were featureless, with no Tg detected up to the 300° C. maximum temperature for the DSC analysis (Table II). For the first, second, third, and fourth scans, residual cure exothermicity was detected with an onset of 259.5° C., 276.9° C., 283.3° C., and 281.5° C., respectively, with no indication of decomposition.

Example 3

Preparation of Curable Blend of Epoxy Resin of Polyphenol of CDD Trialdehyde, Epoxy Resin of Diphenol of Cyclododecanone (eCDON), and Diethylenetriamine (DETA)

A. Cure Profile of Curable Blend

Epoxy resin of polyphenol of CDD trialdehyde (0.5522 g, 0.0024139 epoxide eq) from Example 1 B and eCDON (2.8599 g, 0.0117539 epoxide eq) was dissolved in THF (35 mL) under a dry, nitrogen atmosphere. The THF used had been purified by passing through a column of heat activated alumina under a dry, nitrogen atmosphere. The eCDON used was prepared by phenolation of cyclododecanone and possessed an EEW of 243.32. DETA (0.2923 g, 0.014166-NH eq) was weighed into the glass bottle containing the THF solution under a dry, nitrogen atmosphere followed by shaking to provide a homogeneous solution. All weighing was completed on scales with 4 place accuracy. A portion (approximately 0.75 g) of the THF solution was added to an aluminum dish and devolatilized in the 21° C. vacuum oven. For analysis of curing, a DSC 2910 Modulated DSC (TA Instruments) was employed, using a heating rate of 7° C. per min from 0° C. to 250° C. under a stream of nitrogen flowing at 35 cubic centimeters per min, with holding at 0° C. for 2 min. The sample weight used for the DSC analysis was measured after completion of the analysis in the event that a weight change was caused by traces of residual THF solvent. For a portion (9.8 mg) of the epoxy resin of polyphenol of CDD trialdehyde, eCDON, and DETA, a 48.5° C. onset to cure was detected, followed by a cure exotherm having a maximum of 100.3° C. and an enthalpy of 256.0 J/g, and an end of cure of 174.5° C. (Table I).

B. DSC Analysis of Cured Product at 300° C.

The remaining blend was held under a dynamic dry nitrogen atmosphere for 48 hr. to devolatilize followed by completion of cured by placing the aluminum dish in an oven which had been preheated to 70° C. for 1 hr, then 100° C. for 1 hr, 125° C. for 1 hr, 150° C. for 1 hr, and 200° C. for 1 hr. The resultant clear unfilled casting was rigid, transparent and yellow colored. DSC analysis of a portion (22.5 mg) of the cured product was completed using a heating rate of 7° C. per min from 0° C. to 300° C. under a stream of nitrogen flowing at 35 cubic centimeters per min, with holding at 300° C. for 5 min. The first scanning did not provide a discernible Tg. The second, third and fourth scannings revealed Tg's of 158.1° C., 173.2° C., and 172.8° C., respectively (Table II). For the first scan, residual cure exothermicity was detected with an onset of 288.3° C., with no indication of decomposition. There was no residual exothermicity detected in any of the other scans which would be indicative of further curing or decomposition.

C. DSC Analysis of Cured Product at 250° C.

DSC analysis of a portion (23.3 mg) of the cured product was completed using a heating rate of 7° C. per min from 0° C. to 250° C. under a stream of nitrogen flowing at 35 cubic centimeters per min. The first scanning did not provide a discernible Tg. The second, third and fourth scannings revealed Tg's of 125.3° C., 130.2° C., and 136.4° C., respectively (Table III). There was no residual exothermicity detected in any of the scans which would be indicative of further curing or decomposition.

Comparative Example A

Preparation of Curable Blend of Epoxy Resin of Diphenol of Cyclododecanone (eCDON), and Diethylenetriamine (DETA)

A. Cure Profile of Curable Blend eCDON (2.6164 g, 0.010753 epoxide eq) was dissolved in THF (30 mL) under a dry, nitrogen atmosphere. The THF used had been purified by passing through a column of heat activated alumina under a dry, nitrogen atmosphere. The eCDON used is described in Example 3 A. DETA (0.2215 g, 0.010735-NH eq) was weighed into the glass bottle containing the THF solution under a dry, nitrogen atmosphere followed by shaking to provide a homogeneous solution. All weighing was completed on scales with 4 place accuracy. A portion (approximately 0.75 g) of the THF solution was added to an aluminum dish and devolatilized in the 21° C. vacuum oven. For analysis of curing, the method of Example 3 A was employed. For a portion (10.8 mg) of the eCDON and DETA, a 56.0° C. onset to cure was detected, followed by a cure exotherm having a maximum of 107.8° C. and an enthalpy of 215.9 J/g, and an end of cure of 191.6° C. (Table I).

B. DSC Analysis of Cured Product at 300° C.

The remaining blend was held under a dynamic dry nitrogen atmosphere for 48 hr. to devolatilize followed by completion of cured by placing the aluminum dish in an oven which had been preheated to 70° C. for 1 hr, then 100° C. for 1 hr, 125° C. for 1 hr, 150° C. for 1 hr, and 200° C. for 1 hr. The resultant clear unfilled casting was rigid, transparent and yellow colored. DSC analysis of a portion (17.8 mg) of the cured product was completed using a heating rate of 7° C. per min from 0° C. to 300° C. under a stream of nitrogen flowing at 35 cubic centimeters per min, with holding at 300° C. for 5 min. The first scanning did not provide a discernible Tg. The second, third and fourth scannings revealed Tg's of 144.3° C., 160.8° C., and 167.9° C., respectively (Table II). There was no residual exothermicity detected in any of the scans which would be indicative of further curing or decomposition.

C. DSC Analysis of Cured Product at 250° C.

DSC analysis of a portion (18.5 mg) of the cured product was completed using a heating rate of 7° C. per min from 0° C. to 250° C. under a stream of nitrogen flowing at 35 cubic centimeters per min. The first scanning did not provide a discernible Tg. The second, third and fourth scannings revealed Tg's of 107.7° C., 115.1° C., and 121.8° C., respectively (Table III). There was no residual exothermicity detected in any of the scans which would be indicative of further curing or decomposition.

TABLE I

| Designation | Onset to Cure (° C.) | Maximum Exotherm (° C.) | End of Cure (° C.) | Enthalpy (J/g) |
| --- | --- | --- | --- | --- |
| Example 2 | 49.2 | 85.4 | 198.4 | 141.9 |
| Example 3 | 48.5 | 100.3 | 174.5 | 256.0 |
| Comparative Example A | 56.0 | 107.8 | 191.6 | 215.9 |

TABLE II

| Designation | 1$^{st}$ Scan Tg (° C.) | 2$^{nd}$ Scan Tg (° C.) | 3$^{rd}$ Scan Tg (° C.) | 4$^{th}$ Scan Tg (° C.) |
| --- | --- | --- | --- | --- |
| Example 2 | — | >300 | >300 | >300 |
| Example 3 B | — | 158.1 | 173.2 | 172.8 |
| Comparative Example A B | — | 144.3 | 160.8 | 167.9 |

TABLE III

| Designation | 1$^{st}$ Scan Tg (° C.) | 2$^{nd}$ Scan Tg (° C.) | 3$^{rd}$ Scan Tg (° C.) | 4$^{th}$ Scan Tg (° C.) |
| --- | --- | --- | --- | --- |
| Example 3 C | — | 125.3 | 130.2 | 136.4 |
| Comparative Example A C | — | 107.7 | 115.1 | 121.8 |

Example 4

Preparation and Curing of Powder Coating Formulation of Epoxy Resin of Polyphenol of CDD Trialdehyde with Dicyandiamide Epoxy resin of polyphenol of CDD trialdehyde (0.634 g, 0.002277 epoxide eq) from Example 1 B, dicyandiamide (0.035 g, 0.00247 eq), and an imidazole adduct (0.012 g, 33% wt of the dicyandiamide used) were blended to a visually homogenous powder for 1 min at 23° C. The dicyandiamide was obtained as a commercial grade product, Amicure® CG-1200 Curing Agent from Air Products and Chemicals, Inc., with particle size specifications of 90%<30µ; 50%<11µ, and contained 0.5% wt internal flow control agent. The imidazole adduct was obtained as a commercial grade product from Hexion Specialty Chemicals, Epikure™ P-101 Curing Agent. All weighing was completed on scales with 3 place accuracy. A portion (approximately 0.1 g) of the curable blend was added to a glass vial and held for DSC analysis. For analysis of curing, a DSC 2910 Modulated DSC (TA Instruments) was employed, using a heating rate of 7° C. per min from 25° C. to 300° C. under a stream of nitrogen flowing at 35 cubic centimeters per min, with holding at 25° C. for 2 min. For a portion (9.7 mg) of the epoxy resin of polyphenol of CDD trialdehyde, dicyandiamide, and an imidazole adduct, an endotherm was initially detected with a minimum at 102.4° C. and an enthalpy of 3.2 J/g. An exotherm with a 137.9° C. onset to cure was detected, a maximum of 194.7° C. and an enthalpy of 105.3 J/g, and an end of cure of 266.2° C. (Table IV).

The remaining powder blend was added to an aluminum dish and cured by placing the aluminum dish in an oven which had been preheated to 200° C. for 30 min. The resultant clear unfilled casting was rigid, opaque and golden yellow colored. DSC analysis of a portion (26.9 mg) of the cured product was completed using a heating rate of 7° C. per min from 0° C. to 300° C. under a stream of nitrogen flowing at 35 cubic centimeters per min, with holding at 300° C. for 5 min. The first, second, and third scannings were featureless, with no Tg detected up to the 300° C. maximum temperature for the DSC analysis (Table V). For the first, second, and third scans, residual cure exothermicity was detected with an onset of 207.9° C., 270.8° C., and 291.1° C., respectively, with no indication of decomposition.

Example 5

Preparation and Curing of Powder Coating Formulation of Epoxy Resin of Polyphenol of CDD Trialdehyde and Epoxy Resin of Diphenol of Cyclododecanone (eCDON) with Dicyandiamide Epoxy resin of polyphenol of CDD trialdehyde (0.253 g, 0.001106 epoxide eq) from Example 1 B, and eCDON (0.753 g, 0.000420 epoxide eq), dicyandiamide (0.053 g, 0.003753 eq), and an imidazole adduct (0.017 g, 33% wt of the dicyandiamide used) were blended to a visually homogenous powder for 1 min at 23° C. The eCDON used is described in Example 3 A. The dicyandiamide and imidazole adduct used are described in Example 4. All weighing was completed on scales with 3 place accuracy. A portion (approximately 0.1 g) of the curable blend was added to a glass vial and held for DSC analysis. For analysis of curing, a DSC 2910 Modulated DSC (TA Instruments) was employed, using a heating rate of 7° C. per min from 25° C. to 300° C. under a stream of nitrogen flowing at 35 cubic centimeters per min, with holding at 25° C. for 2 min. For a portion (9.7 mg) of the epoxy resin of polyphenol of CDD trialdehyde, eCDON, dicyandiamide, and an imidazole adduct, an exotherm with a 116.6° C. onset to cure was detected, a maximum of 170.7° C. and an enthalpy of 133.5 J/g, and end of cure of 270.1° C. (Table IV). The peak for the exotherm included a trailing edge shoulder.

The remaining powder blend was added to an aluminum dish and cured by placing the aluminum dish in an oven which had been preheated to 200° C. for 30 min. The resultant clear unfilled casting was rigid, transparent and yellow colored. DSC analysis of a portion (32.4 mg) of the cured product was completed using a heating rate of 7° C. per min from 0° C. to 300° C. under a stream of nitrogen flowing at 35 cubic centimeters per min, with holding at 300° C. for 5 min. The first scanning did not provide a discernible Tg. The second, third and fourth scannings revealed Tg's of 196.9° C., 196.5° C., and 190.2° C., respectively (Table V). For the first, second, third, and fourth scans, residual cure exothermicity was detected with an onset of 201.9° C., 255.6° C., 258.4° C., and 230.7° C., respectively, with no indication of decomposition.

Comparative Example B

Preparation and Curing of Powder Coating Formulation of Epoxy Resin of Diphenol of Cyclododecanone (eCDON) with Dicyandiamide eCDON (0.590 g, 0.002425 epoxide eq), dicyandiamide (0.030 g, 0.002166 eq), and an imidazole adduct (0.010 g, 33% wt of the dicyandiamide used) were blended to a visually homogenous powder for 1 min at 23° C. The eCDON used is described in Example 3 A. The dicyandiamide and imidazole adduct used are described in Example 4. All weighing was completed on scales with 3 place accuracy. A portion (approximately 0.1 g) of the curable blend was added to a glass vial and held for DSC analysis using the method of Example 5. For a portion (10.1 mg) of eCDON, dicyandiamide, and an imidazole adduct, an exotherm with a 130.1° C. onset to cure was detected, a maximum of 170.8° C. and an enthalpy of 176.9 J/g, and an end of cure of 266.2° C. (Table IV). The peak for the exotherm included a trailing edge shoulder.

The remaining powder blend was added to an aluminum dish and cured by placing the aluminum dish in an oven which had been preheated to 200° C. for 30 min. The resultant clear unfilled casting was rigid, transparent and yellow colored. DSC analysis of a portion (28.4 mg) of the cured product was completed using the method of Example 5. The first scanning did not provide a discernible Tg. The second, third and fourth scannings revealed Tg's of 188.1° C., 184.1° C., and 176.9° C., respectively (Table V). For the first and second scans, residual cure exothermicity was detected with an onset of 207.2° C., and 287.5° C., respectively, with no indication of decomposition.

TABLE IV

| Designation | Onset to Cure (° C.) | Maximum Exotherm (° C.) | End of Cure (° C.) | Enthalpy (J/g) |
|---|---|---|---|---|
| Example 4[a] | 137.9 | 194.7 | 266.2 | 105.3 |
| Example 5 | 116.6 | 170.7 | 270.1 | 133.5 |
| Example 6 | 119.4 | 189.7 | 274.8 | 177.7 |
| Comparative Example B | 130.1 | 170.8 | 266.2 | 176.9 |

[a] a minor endotherm with a minimum at 102.4° C. and an enthalpy of 3.2 J/g preceded the exothermic cure

TABLE V

| Designation | 1st Scan Tg (° C.) | 2nd Scan Tg (° C.) | 3rd Scan Tg (° C.) | 4th Scan Tg (° C.) |
|---|---|---|---|---|
| Example 4 | — | >300 | >300 | >300 |
| Example 5 | — | 196.9 | 196.5 | 190.2 |
| Example 6 | — | 215.3 | 216.9 | 216.5 |
| Comparative Example B | — | 188.1 | 184.9 | 176.9 |

Example 6

Preparation and Curing of Powder Coating Formulation of Epoxy Resin of Polyphenol of CDD Trialdehyde and Epoxy Resin of Diphenol of Cyclododecanone (eCDON) with Dicyandiamide Epoxy resin of polyphenol of CDD trialdehyde (0.310 g, 0.001355 epoxide eq) from Example 1 B, and eCDON (0.310 g, 0.001274 epoxide eq), dicyandiamide (0.033 g, 0.002349 eq), and an imidazole adduct (0.011 g, 33% wt of the dicyandiamide used) were blended to a visually homogenous powder for 1 min at 23° C. The eCDON used is described in Example 3 A. The dicyandiamide and imidazole adduct used are described in Example 4. All weighing was completed on scales with 3 place accuracy. A portion (approximately 0.1 g) of the curable blend was added to a glass vial and held for DSC analysis using the method of Example 5. For a portion (11.1 mg) of the epoxy resin of polyphenol of CDD trialdehyde, eCDON, dicyandiamide, and an imidazole adduct, an exotherm with a 119.4° C. onset to cure was detected, a maximum of 189.7° C. and an enthalpy of 177.7 J/g, and an end of cure of 274.8° C. (Table IV). The peak for the exotherm included a trailing edge shoulder.

The remaining powder blend was added to an aluminum dish and cured by placing the aluminum dish in an oven which had been preheated to 200° C. for 30 min. The resultant clear unfilled casting was rigid, transparent and yellow colored. DSC analysis of a portion (32.2 mg) of the cured product was completed using the method of Example 5. The first scanning did not provide a discernible Tg. The second, third and fourth scannings revealed Tg's of 215.3° C., 216.9° C., and 216.5° C., respectively (Table V). For the first, second, third, and fourth scans, residual cure exothermicity was detected with an onset of 205.4° C., 260.2° C., 261.9° C., and 258.4° C., respectively, with no indication of decomposition.

What is claimed is:

1. Polyglycidyl ethers of the formula:

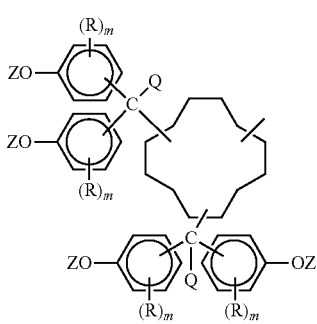

-continued

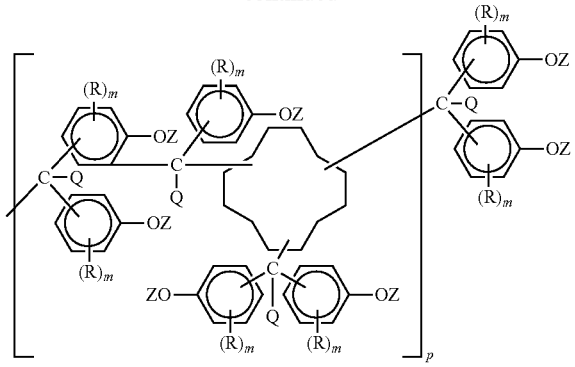

where each Z is a

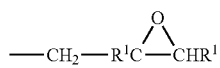

group, wherein each $R^1$ is independently H or methyl;
each m independently has a value of zero to 3;
p has a value of 1 to 20;
each R is independently halogen; nitrile; nitro; $C_1$-$C_6$ alkyl or $C_1$-$C_6$ alkoxy;
wherein the alkyl and alkoxy groups may be substituted with one or more halogen atoms, $C_2$-$C_6$ alkenyl, or $C_2$-$C_6$ alkenyloxy; and
each Q is independently hydrogen or $C_1$-$C_6$ alkyl, or when m is 2, two R groups may independently be a $C_3$-$C_4$ alkylene group that optionally contains one or two double bonds and is bonded to two adjacent carbons on the ring to which they are attached; thereby producing a fused, bicyclic ring.

2. Polyglycidyl ethers of claim 1, wherein $R^1$ is H.

3. Polyglycidyl ethers of claim 1, wherein Q is H or $C_1$-$C_2$ alkyl.

4. Polyglycidyl ethers of claim 1, wherein m is 0.

5. Polyglycidyl ethers of claim 1, wherein p is 0 or 1.

6. Methods of making the compounds of claim 1, comprising reacting polyphenols of the formula:

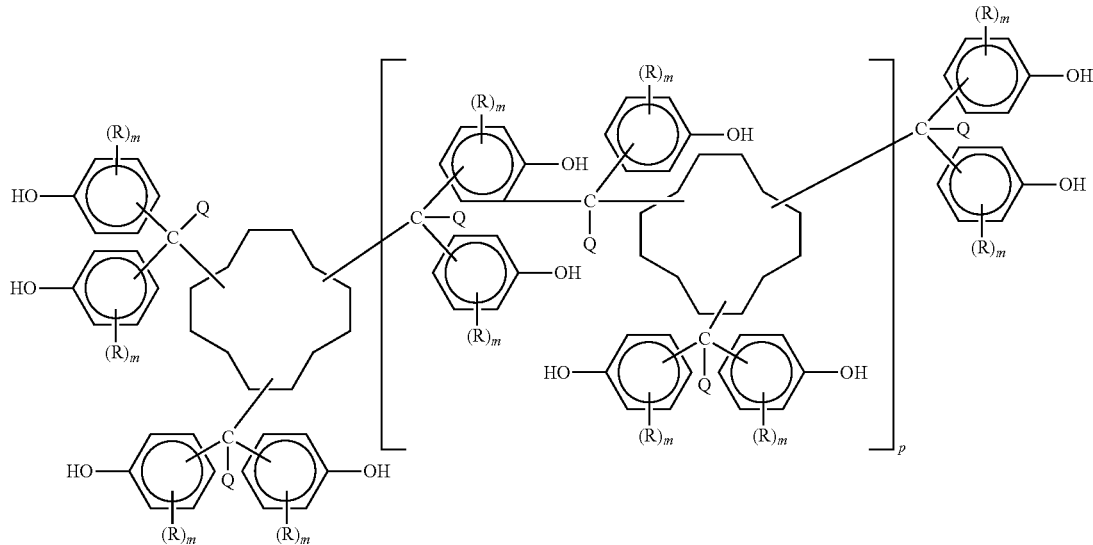

with an epihalohydrin in the presence of a base, and optionally in the presence of a catalyst, a solvent or both.

7. Methods of claim 6, wherein the reaction is conducted in the presence of at least one solvent.

8. Methods of claim 7, wherein the at least one solvent is a $C_1$-$C_6$ alcohol.

9. Methods of claim 6, wherein the base is an inorganic hydroxide.

10. Methods of claim 9, wherein the base is aqueous NaOH or KOH.

11. Methods of claim 6, wherein the reaction temperature is 25° C. to 160° C.

12. Curable compositions comprising 1) at least one curing agent and 2) a first epoxy resin of the formula:

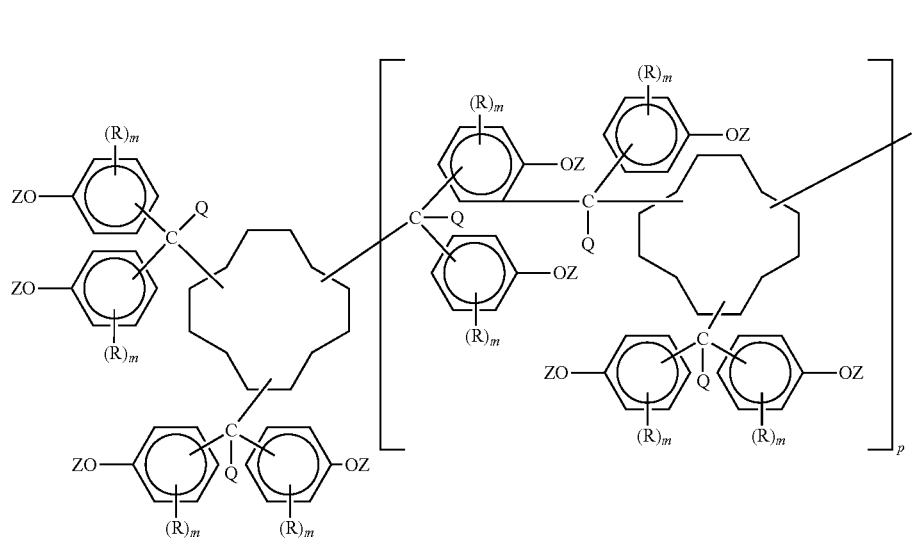

where each Z is a

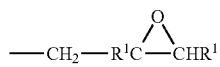

group, wherein each $R^1$ is independently H or methyl;
each m independently has a value of zero to 3;
p has a value of 1 to 20;
each R is independently halogen; nitrile; nitro; $C_1$-$C_6$ alkyl or $C_1$-$C_6$ alkoxy; wherein the alkyl and alkoxy groups may be substituted with one or more halogen atoms, $C_2$-$C_6$ alkenyl, or $C_2$-$C_6$ alkenyloxy; and
each Q is independently hydrogen or $C_1$-$C_6$ alkyl, or when m is 2, two R groups may independently be a $C_3$-$C_4$ alkylene group that optionally contains one or two double bonds and is bonded to two adjacent carbons on the ring to which they are attached; thereby producing a fused, bicyclic ring.

13. Curable compositions according to claim 12, further comprising a catalyst.

14. Curable compositions of claim 12, further comprising a second epoxy resin other than the epoxy resin of the formula of claim 12.

15. Curable compositions according to claim 14, wherein the second epoxy resin comprises an epoxide-containing compound having an average of more than one epoxide group per molecule wherein the second epoxy resin comprises a glycidyl ether, glycidyl thioether, glycidyl amine or glycidyl ester compound having an average of more than one epoxide group per molecule.

16. Curable compositions according to claim 12 wherein the composition is a curable powder coating composition.

17. Cured compositions prepared from the compositions of claim 12, that are structural or electrical laminate and/or composites, multilayer electronic circuitry, integrated circuit packaging, filament windings, moldings, encapsulations, castings, composites for aerospace applications, adhesives, functional powder coatings and other protective coatings.

18. Adducts prepared by reacting one or more polyglycidyl ethers of the formula of claim 12 with one or more hydrogen containing compounds possessing one of more hydrogen atoms per molecule that react with the epoxide groups the formula of claim 12 and optionally one or more second epoxy resins, one or more solvents, one or more catalysts, or combinations thereof.

19. Adducts of claim 18, further comprising one or more second epoxy resins and/or one or more polyglycidyl ethers of the formula of claim 12, and optionally one or more curing agents, wherein said curing agents are other than the adduct, and optionally one or more catalysts, where the adduct is curable.

20. The cured composition of claim 19.

* * * * *